United States Patent
Chen

(10) Patent No.: US 7,766,584 B2
(45) Date of Patent: Aug. 3, 2010

(54) DRILLING AUXILIARY DEVICE HAVING A COOLING EFFECT

(76) Inventor: Lung-Chih Chen, 108, Shengli $2^{nd}$ St., Tanzih Township, Taichung County (TW)

( * ) Notice: Subject to any disclaimer, the term of this patent is extended or adjusted under 35 U.S.C. 154(b) by 323 days.

(21) Appl. No.: 12/045,912

(22) Filed: Mar. 11, 2008

(65) Prior Publication Data
US 2009/0092454 A1  Apr. 9, 2009

(30) Foreign Application Priority Data
May 10, 2007  (TW) .............................. 96207527 U

(51) Int. Cl.
*B23Q 11/10* (2006.01)
(52) U.S. Cl. ...................... 408/115 R; 408/56
(58) Field of Classification Search .................. 408/56, 408/57, 59, 72 R, 72 B, 97, 115 R, 115 B, 408/241 B; 175/209; *B23B 47/28, 49/00, B23B 49/02, 51/06; B23Q 11/10*
See application file for complete search history.

(56) References Cited

U.S. PATENT DOCUMENTS

| | | | | |
|---|---|---|---|---|
| 1,651,353 A | * | 12/1927 | Aldeen | 408/97 |
| 1,857,748 A | * | 5/1932 | Walker | 408/56 |
| 2,184,919 A | * | 12/1939 | Miller | 408/56 |
| 2,428,201 A | * | 9/1947 | Cannarili et al. | 408/72 R |
| 2,870,993 A | * | 1/1959 | Jahnke | 175/209 |
| 4,662,802 A | * | 5/1987 | Osterman | 408/67 |

FOREIGN PATENT DOCUMENTS

| | | | |
|---|---|---|---|
| DE | 202006018537 U1 | * | 3/2007 |
| DE | 202009013071 U1 | * | 1/2010 |
| EP | 1767323 A2 | * | 3/2007 |
| GB | 2435439 A | * | 8/2007 |
| GB | 2450529 A | * | 12/2008 |

* cited by examiner

*Primary Examiner*—Daniel W Howell
(74) *Attorney, Agent, or Firm*—Alan Kamrath; Kamrath & Associates PA

(57) ABSTRACT

An auxiliary device for a drill includes a base having a first side provided with a gathering portion, a fixing post mounted on a second side of the base and provided with a limit hole connected to the gathering portion, a water inlet port mounted on the second side of the base and provided with a water inlet hole connected to the gathering portion, and a water outlet port mounted on the second side of the base and provided with a water outlet hole connected to the gathering portion. Thus, the cooling water flows through the water inlet hole of the water inlet port into the gathering portion of the base to surround the drill bit so as to provide a cooling effect to the drill bit and the workpiece during the drilling process.

14 Claims, 6 Drawing Sheets

DRILLING AUXILIARY DEVICE HAVING A COOLING EFFECT

BACKGROUND OF THE INVENTION

1. Field of the Invention

The present invention relates to an auxiliary device and, more particularly, to an auxiliary device for a drill bit of a drill to facilitate a drill working process.

2. Description of the Related Art

A conventional auxiliary device for a drill in accordance with the prior art shown in FIGS. 5 and 6 comprises a base 40, a bonding member 41 mounted on a first side of the base 40 to attach the base 40 to a surface, a fixing post 42 mounted on a second side of the base 40 and having an inside provided with a limit hole 43, and a cross-shaped centering marking 44 mounted on the second side of the base 40. In operation, the centering marking 44 initially aligns with a drilling position of a workpiece 52. Then, the bonding member 41 is bonded onto a surface of the workpiece 52 to attach the base 40 onto the workpiece 52. Then, a drill bit 50 of a drill is introduced into and guided by the limit hole 43 of the fixing post 42 to drill a hole 54 in the workpiece 52. Thus, the drill bit 50 of the drill is limited by the limit hole 43 of the fixing post 42 to prevent the drill bit 50 from being deflected or vibrated during the drilling process.

However, the auxiliary device is not provided with a cooling agent to cool the drill bit so that the drill bit is easily distorted or deformed due to a high temperature or overheat during the drilling process, thereby decreasing the lifetime of the drill bit. In addition, the drill bit is easily choked or jammed by the drilled chips produced from the workpiece 52 during the drilling process, thereby decreasing the working efficiency of the drill bit. Further, a user has to hold a bottle by his one hand to fill a cooling agent to cool the drill bit during the drilling process, thereby causing inconvenience to the user when operating the drill bit.

BRIEF SUMMARY OF THE INVENTION

In accordance with the present invention, there is provided an auxiliary device for a drill, comprising a base having a first side provided with a gathering portion, a fixing post mounted on a second side of the base and having an inside provided with a limit hole connected to the gathering portion of the base, a water inlet port mounted on the second side of the base and having an inside provided with a water inlet hole connected to the gathering portion of the base, and a water outlet port mounted on the second side of the base and having an inside provided with a water outlet hole connected to the gathering portion of the base.

The primary objective of the present invention is to provide a drilling auxiliary device having a cooling effect.

Another objective of the present invention is to provide an auxiliary device for a drill, wherein the cooling water from the water inlet pipe flows through the water inlet hole of the water inlet port into the gathering portion of the base to surround the drill bit so as to provide a cooling effect to the drill bit and the workpiece during the drilling process, thereby preventing the drill bit from being distorted or deformed due to a high temperature or overheat, and thereby enhancing the lifetime of the drill bit.

A further objective of the present invention is to provide an auxiliary device for a drill, wherein the used cooling water and drilled chips are drained outwardly from the water outlet hole of the water outlet port to prevent the drill bit from being choked or jammed during the drilling process, thereby facilitating operation of the drill bit, and thereby enhancing the working efficiency.

A further objective of the present invention is to provide an auxiliary device for a drill, wherein the water inlet pipe is connected to a water filler to fill the cooling water into the water inlet port automatically, so that a user needs not to fill the cooling water by his one hand, thereby facilitating the user operating the drill bit.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
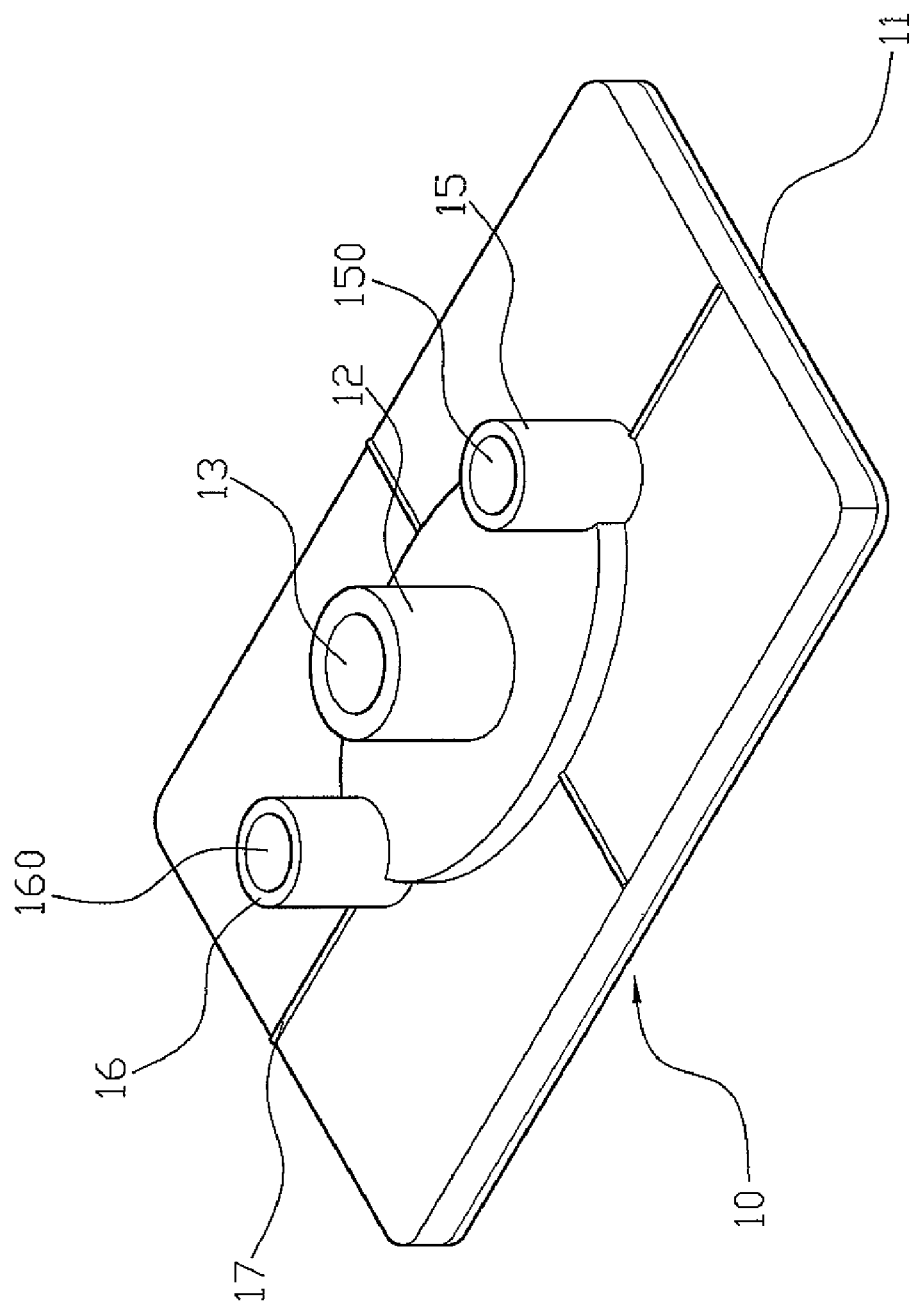
FIG. 1 is a perspective view of an auxiliary device in accordance with the preferred embodiment of the present invention.
Figure 2:
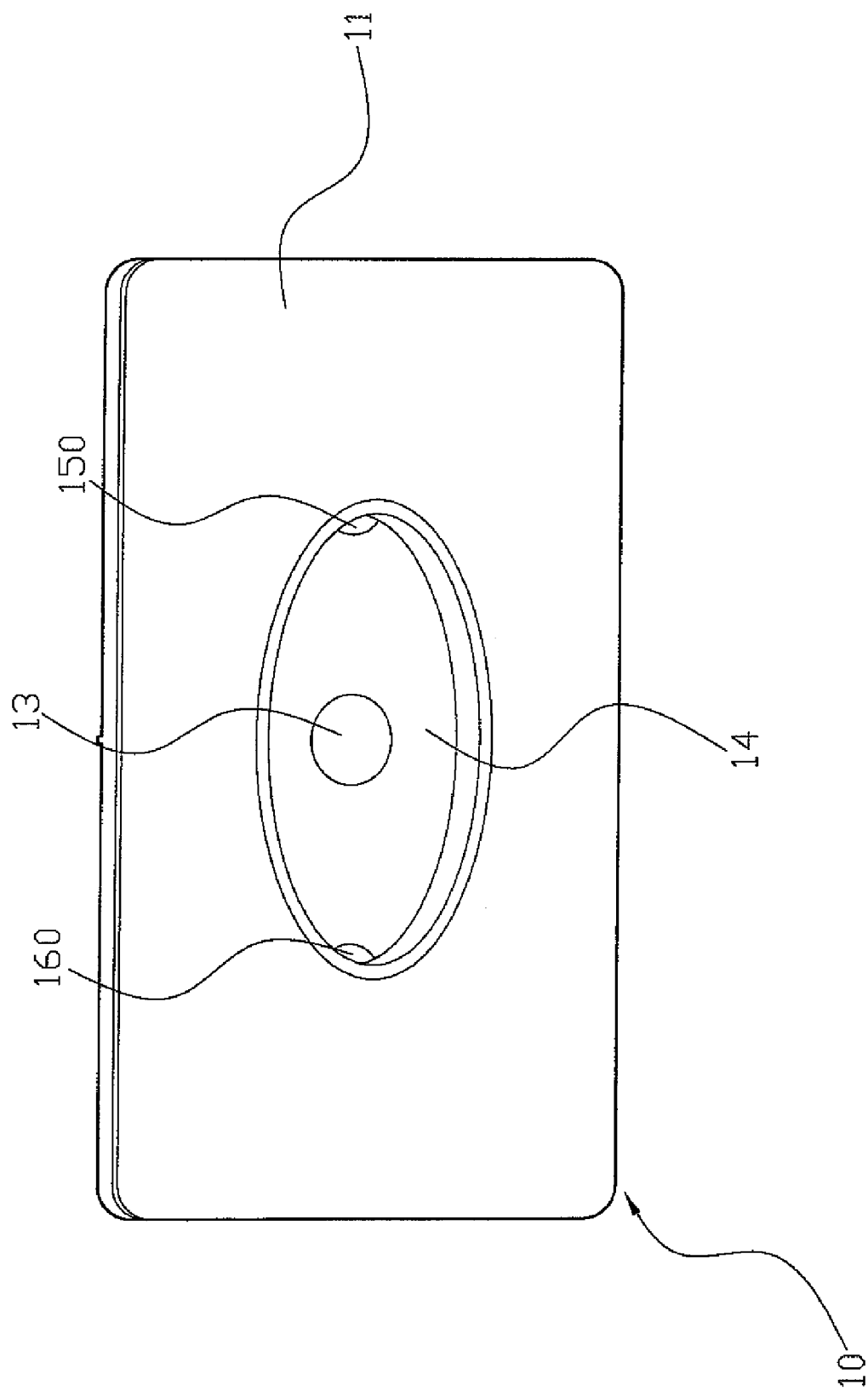
FIG. 2 is a bottom view of the auxiliary device as shown in FIG. 1.
Figure 3:
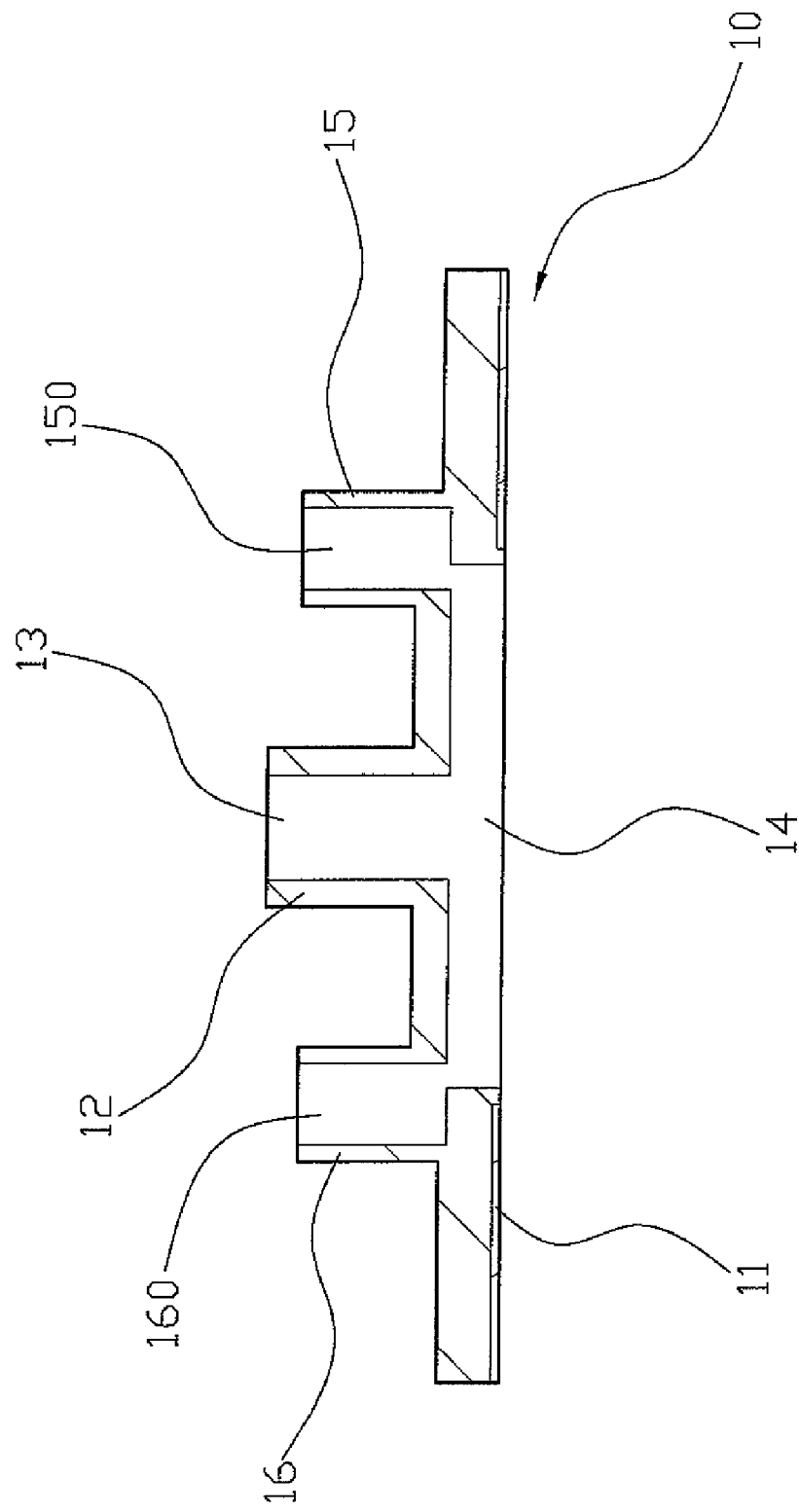
FIG. 3 is a front cross-sectional view of the auxiliary device as shown in FIG. 1

Referring to the drawings and initially to FIGS. 1-3, an auxiliary device for a drill in accordance with the preferred embodiment of the present invention comprises a base 10 having a first side provided with a gathering portion 14, a bonding member 11 (such as a double-sided adhesive) mounted on the first side of the base 10 to attach the base 10 to a surface, a fixing post 12 mounted on a second side of the base 10 and having an inside provided with a limit hole 13 connected to the gathering portion 14 of the base 10, a cross-shaped centering marking 17 mounted on the second side of the base 10 and having a center aligning with a center of the limit hole 13 of the fixing post 12, a water inlet port 15 mounted on the second side of the base 10 and having an inside provided with a water inlet hole 150 connected to the gathering portion 14 of the base 10, and a water outlet port 16 mounted on the second side of the base 10 and having an inside provided with a water outlet hole 160 connected to the gathering portion 14 of the base 10.

The gathering portion 14 of the base 10 is an elongate recessed portion and has a substantially oblong profile. The gathering portion 14 of the base 10 has a dimension greater than that of the limit hole 13 of the fixing post 12.

The fixing post 12 is located between the water inlet port 15 and the water outlet port 16, and the limit hole 13 of the fixing post 12 is located between the water inlet hole 150 of the water inlet port 15 and the water outlet hole 160 of the water outlet port 16 so that the limit hole 13 of the fixing post 12 is connected between the water inlet hole 150 of the water inlet port 15 and the water outlet hole 160 of the water outlet port 16 through the gathering portion 14 of the base 10.

The water inlet port 15 is an upright tube protruding outwardly from the second side of the base 10, and the water outlet port 16 is also an upright tube protruding outwardly from the second side of the base 10.

Figure 4:
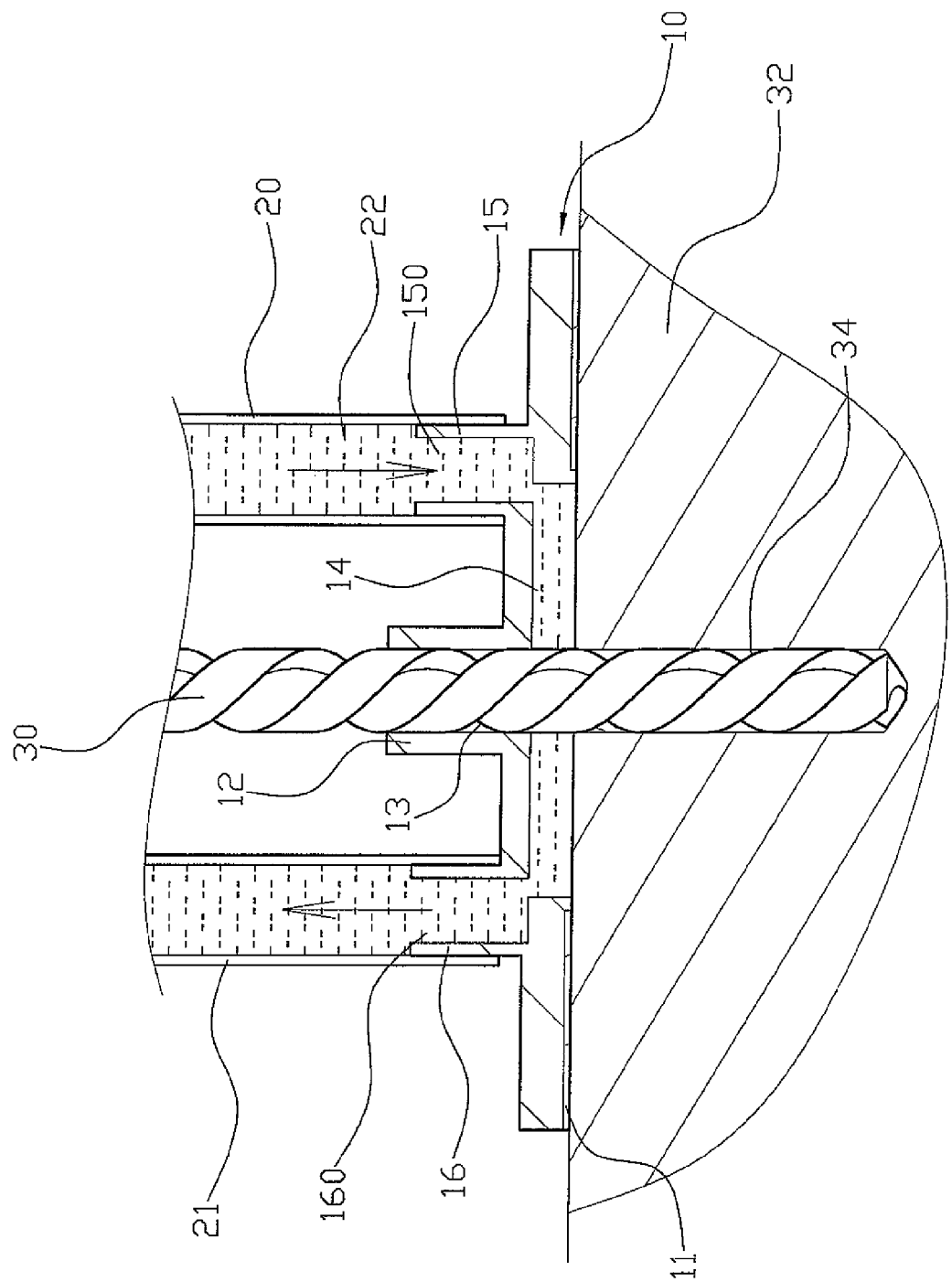
FIG. 4 is a schematic operational view of the auxiliary device for a drill bit of a drill as shown in FIG. 3.
Figure 5:
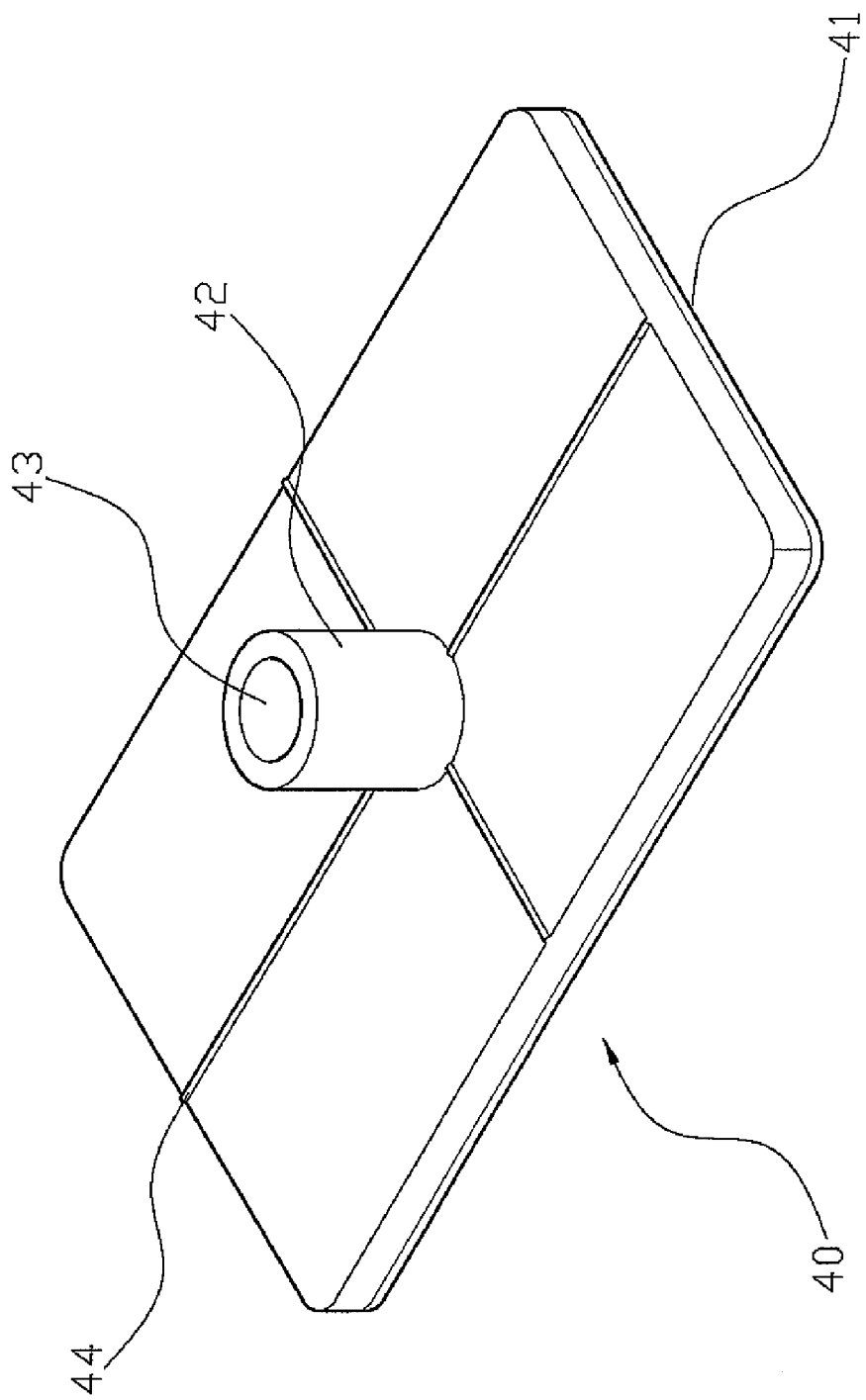
FIG. 5 is a perspective view of a conventional auxiliary device in accordance with the prior art.
Figure 6:
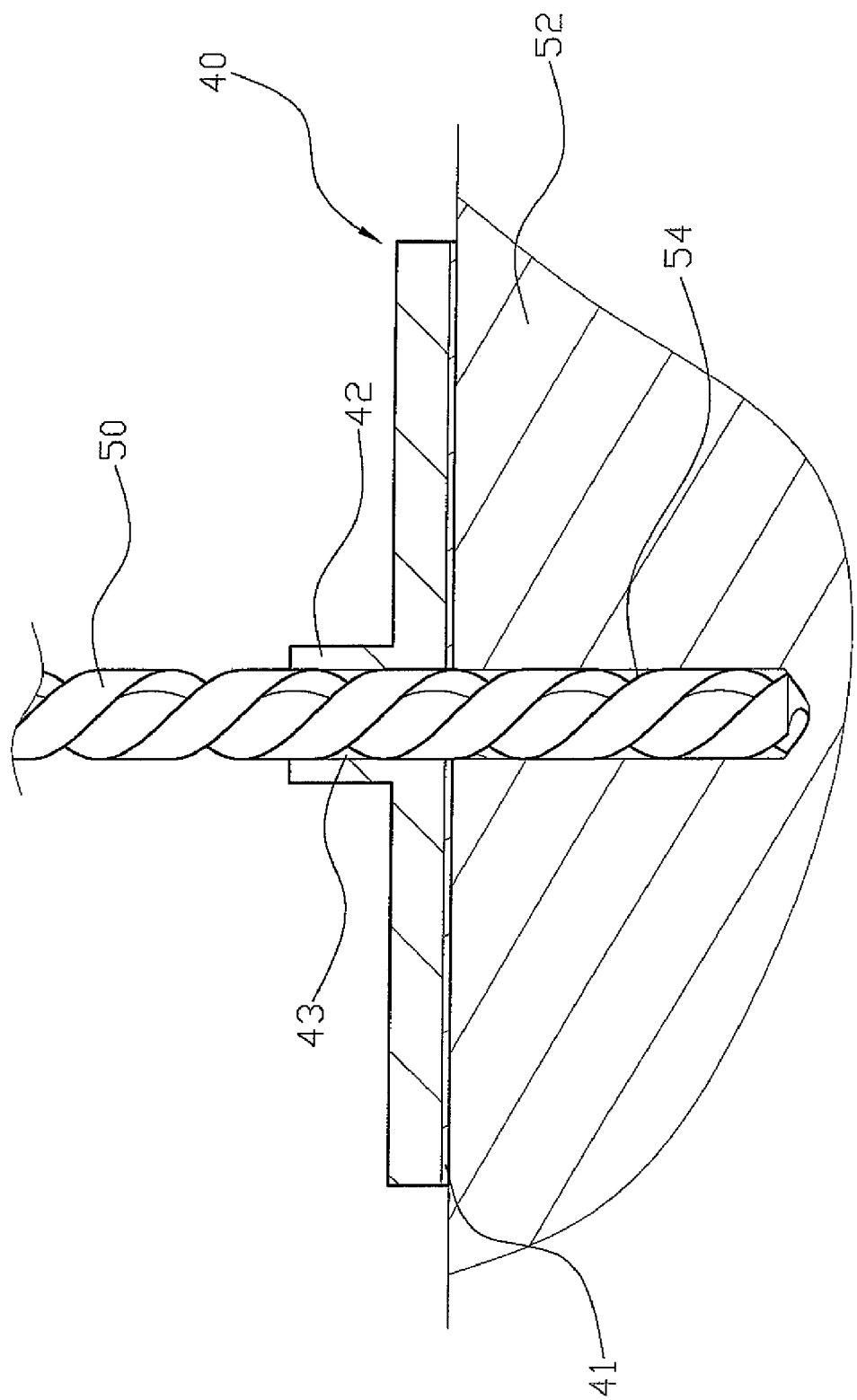
FIG. 6 is a front cross-sectional operational view of the conventional auxiliary device for a drill bit of a drill as shown in FIG. 5.

As shown in FIG. 4, the auxiliary device further comprises a water inlet pipe 20 mounted on the water inlet port 15 to introduce a fluid, such as cooling water 22 (functioning as a cooling agent), into the water inlet hole 150 of the water inlet port 15, and a water outlet pipe 21 mounted on the water outlet port 16 to drain the cooling water 22 outwardly from the water outlet hole 160 of the water outlet port 16.

In operation, referring to FIG. 4 with reference to FIGS. 1-3, the centering marking 17 initially aligns with a drilling position of a workpiece 32. Then, the bonding member 11 is bonded onto a surface of the workpiece 32 to attach the base 10 onto the workpiece 32. Then, a drill bit 30 of a drill is introduced into and guided by the limit hole 13 of the fixing post 12 and passes through the gathering portion 14 of the base 10 to drill a hole 34 in the workpiece 32. At this time, the cooling water 22 (functioning as a cooling agent) from the water inlet pipe 20 flows through the water inlet hole 150 of the water inlet port 15 into the gathering portion 14 of the base 10 to surround the drill bit 30 so as to provide a cooling effect to the drill bit 30 and the workpiece 32 during the drilling process. Then, the used cooling water 22 and drilled chips are drained outwardly from the water outlet hole 160 of the water outlet port 16.

Accordingly, the cooling water 22 from the water inlet pipe 20 flows through the water inlet hole 150 of the water inlet port 15 into the gathering portion 14 of the base 10 to surround the drill bit 30 so as to provide a cooling effect to the drill bit 30 and the workpiece 32 during the drilling process, thereby preventing the drill bit 30 from being distorted or deformed due to a high temperature or overheat, and thereby enhancing the lifetime of the drill bit 30. In addition, the used cooling water 22 and drilled chips are drained outwardly from the water outlet hole 160 of the water outlet port 16 to prevent the drill bit 30 from being choked or jammed during the drilling process, thereby facilitating operation of the drill bit 30, and thereby enhancing the working efficiency. Further, the water inlet pipe 20 is connected to a water filler (not shown) to fill the cooling water 22 into the water inlet port 15 automatically, so that a user needs not to fill the cooling water 22 by his one hand, thereby facilitating the user operating the drill bit 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An auxiliary device for a drill, comprising:
a base having a first side provided with a gathering portion;
a fixing post mounted on a second side of the base and having an inside provided with a limit hole connected to the gathering portion of the base;
a water inlet port mounted on the second side of the base and having an inside provided with a water inlet hole connected to the gathering portion of the base;
a water outlet port mounted on the second side of the base and having an inside provided with a water outlet hole connected to the gathering portion of the base.

2. The auxiliary device for a drill in accordance with claim 1, wherein the gathering portion of the base is an elongate recessed portion.

3. The auxiliary device for a drill in accordance with claim 1, wherein the gathering portion of the base has a substantially oblong profile.

4. The auxiliary device for a drill in accordance with claim 1, wherein the gathering portion of the base has a dimension greater than that of the limit hole of the fixing post.

5. The auxiliary device for a drill in accordance with claim 1, wherein the fixing post is located between the water inlet port and the water outlet port.

6. The auxiliary device for a drill in accordance with claim 5, wherein the limit hole of the fixing post is located between the water inlet hole of the water inlet port and the water outlet hole of the water outlet port.

7. The auxiliary device for a drill in accordance with claim 6, wherein the limit hole of the fixing post is connected between the water inlet hole of the water inlet port and the water outlet hole of the water outlet port through the gathering portion of the base.

8. The auxiliary device for a drill in accordance with claim 1, wherein the water inlet port is an upright tube protruding outwardly from the second side of the base.

9. The auxiliary device for a drill in accordance with claim 1, wherein the water outlet port is also an upright tube protruding outwardly from the second side of the base.

10. The auxiliary device for a drill in accordance with claim 1, further comprising:
a water inlet pipe mounted on the water inlet port to introduce a cooling water into the water inlet hole of the water inlet port;
a water outlet pipe mounted on the water outlet port to drain the cooling water outwardly from the water outlet hole of the water outlet port.

11. The auxiliary device for a drill in accordance with claim 10, wherein the cooling water flows through the water inlet hole of the water inlet port into the gathering portion of the base to surround the gathering portion of the base.

12. The auxiliary device for a drill in accordance with claim 11, wherein the cooling water flows from the gathering portion of the base into the water outlet hole of the water outlet port.

13. The auxiliary device for a drill in accordance with claim 1, further comprising:
a bonding member mounted on the first side of the base.

14. The auxiliary device for a drill in accordance with claim 1, further comprising:
a cross-shaped centering marking mounted on the second side of the base and having a center aligning with a center of the limit hole of the fixing post.

* * * * *